(12) United States Patent
Byrd

(10) Patent No.: US 11,550,688 B2
(45) Date of Patent: Jan. 10, 2023

(54) USER INTERACTION LOGIC CLASSIFICATION

(71) Applicant: ENTIT SOFTWARE LLC, Sanford, NC (US)

(72) Inventor: Christopher Byrd, New Milford, CT (US)

(73) Assignee: MICRO FOCUS LLC, Sanford, NC (US)

( * ) Notice: Subject to any disclaimer, the term of this patent is extended or adjusted under 35 U.S.C. 154(b) by 563 days.

(21) Appl. No.: 15/770,951

(22) PCT Filed: Oct. 29, 2015

(86) PCT No.: PCT/US2015/058137
§ 371 (c)(1),
(2) Date: Apr. 25, 2018

(87) PCT Pub. No.: WO2017/074401
PCT Pub. Date: May 4, 2017

(65) Prior Publication Data
US 2018/0329795 A1 Nov. 15, 2018

(51) Int. Cl.
*G06F 11/34* (2006.01)
*G06F 9/44* (2018.01)
(Continued)

(52) U.S. Cl.
CPC .......... *G06F 11/3438* (2013.01); *G06F 3/048* (2013.01); *G06F 9/44* (2013.01);
(Continued)

(58) Field of Classification Search
CPC ...... G06F 8/433; G06F 9/5038; G06F 9/5061; G06F 9/5066; G06F 9/5072;
(Continued)

(56) References Cited

U.S. PATENT DOCUMENTS 6,341,369 B1 * 1/2002 Degenaro .............. G06Q 10/10
717/117
6,925,452 B1 * 8/2005 Hellerstein ............ G06N 20/00
706/16

(Continued)

FOREIGN PATENT DOCUMENTS

WO WO2008008142 1/2008
WO WO2015026273 2/2015

OTHER PUBLICATIONS

International Search Report and Written Opinion dated Jul. 12, 2016, PCT Patent Application No. PCT/US2015/058137 dated Oct. 29, 2015, Korean Intellectual Property Office, 9 pages.

(Continued)

*Primary Examiner* — George C Neurauter, Jr.

(57) ABSTRACT

Back end calls triggered by a user interaction with a client user interface may be identified. The user interaction may be correlated with a logic flow, and the logic flow may be associated with the back end calls. A supervised learning model may be trained using a labeled data set comprising the back end calls and their associated logic flow. Rules may be derived from the supervised learning model for classifying other back end calls. The rules may be outputted to a classifier that utilizes the rules to associate the other back end calls with the logic flow.

15 Claims, 8 Drawing Sheets

(51) Int. Cl.
*G06F 11/30* (2006.01)
*G06F 3/048* (2013.01)
*G06N 20/00* (2019.01)
*G06N 5/04* (2006.01)
*G06N 5/02* (2006.01)
*G06F 9/451* (2018.01)
*G06K 9/62* (2022.01)
*G06N 3/00* (2006.01)

(52) U.S. Cl.
CPC .............. *G06F 9/451* (2018.02); *G06F 11/30* (2013.01); *G06F 11/3409* (2013.01); *G06K 9/6269* (2013.01); *G06N 5/025* (2013.01); *G06N 5/04* (2013.01); *G06N 20/00* (2019.01); *G06F 2201/87* (2013.01); *G06F 2201/875* (2013.01); *G06N 3/006* (2013.01)

(58) Field of Classification Search
CPC .... G06F 9/5077; G06F 11/30; G06F 11/3438; G06F 11/3409; G06F 2201/87; G06F 2201/875; G06F 3/048; G06F 9/44; G06F 9/451; G06K 9/6269; G06N 3/006; G06N 5/025; G06N 5/04; G06N 20/00
See application file for complete search history.

(56) References Cited

U.S. PATENT DOCUMENTS

| | | | | |
|---|---|---|---|---|
| 7,937,392 B1* | 5/2011 | Nethi | ................ | G06F 16/81 707/737 |
| 8,311,967 B1* | 11/2012 | Lin | ................ | G06N 20/00 706/45 |
| 8,473,431 B1* | 6/2013 | Mann | ................ | G06N 20/00 706/12 |
| 8,489,632 B1* | 7/2013 | Breckenridge | ...... | G06K 9/6288 707/778 |
| 8,516,301 B2 | 8/2013 | Beck et al. | | |
| 8,549,472 B1 | 10/2013 | Tilwani | | |
| 8,635,330 B2 | 1/2014 | Wexler et al. | | |
| 8,762,299 B1* | 6/2014 | Breckenridge | ...... | G06K 9/6227 706/12 |
| 8,856,658 B2 | 10/2014 | Brosh et al. | | |
| 9,146,787 B2* | 9/2015 | Zhu | ................ | G06F 8/74 |
| 9,189,747 B2* | 11/2015 | Mann | ................ | G06N 20/00 |
| 9,342,798 B2* | 5/2016 | Breckenridge | ...... | G06K 9/6227 |
| 9,667,704 B1* | 5/2017 | Sonawane | ............... | H04L 67/10 |
| 2002/0129064 A1* | 9/2002 | Guthrie | ............... | G06F 9/44526 715/234 |
| 2008/0162202 A1* | 7/2008 | Khanna | ................ | G06Q 20/10 705/14.47 |
| 2009/0125496 A1 | 5/2009 | Wexler et al. | | |
| 2010/0153261 A1* | 6/2010 | Tseng | ................ | G06Q 10/06 705/39 |
| 2010/0191624 A1* | 7/2010 | Sharir | ................ | G06Q 30/02 705/30 |
| 2011/0004574 A1* | 1/2011 | Jeong | ................ | G06N 5/02 706/12 |
| 2012/0191631 A1* | 7/2012 | Breckenridge | ........ | G06N 20/00 706/12 |
| 2012/0284213 A1* | 11/2012 | Lin | ................ | G06N 20/00 706/12 |
| 2013/0159408 A1 | 6/2013 | Winn et al. | | |
| 2015/0213365 A1 | 7/2015 | Ideses et al. | | |
| 2015/0277990 A1* | 10/2015 | Xiong | ................ | G06F 9/52 718/106 |
| 2016/0188767 A1* | 6/2016 | Razin | ................ | G06F 17/509 703/13 |
| 2018/0197089 A1* | 7/2018 | Krasser | ................ | H04L 41/145 |
| 2019/0236558 A1* | 8/2019 | Miles | ................ | G06Q 20/02 |

OTHER PUBLICATIONS

Riccardo Spolaor, "Can't you hear me knocking: identification of user actions on Android apps via traffic analysis", Apr. 17, 2014, 65 pages.

* cited by examiner

MACHINE-READABLE STORAGE MEDIUM 500

Identifying instructions to identify back end calls triggered by a user interaction with a client user interface 504

Correlating instructions to correlate the user interaction with a logic flow 508

Associating instructions to associate the logic flow with the back end calls 512

Training instructions to train a supervised learning model using a labeled data set comprising the back end calls and their associated logic flow 516

Deriving instructions to derive rules from the supervised learning model for classifying other back end calls 520

Outputting instructions to output the rules to a classifier that utilizes the rules to associate the other back end calls with the logic flow 524

Back end calls are made to a URL, and the other back end calls are unclassified back end calls that are made to the URL 528

Labeled data set comprises HTTP parameters of the back end calls 532

FIG. 5A

MACHINE-READABLE STORAGE MEDIUM 500

HTTP parameters comprise at least one of an HTTP header and a POST payload 536

Prioritizing instructions to prioritize protocol parameters of the back end calls according to a probability of association with the logic flow 540

Outputting instructions output the rules to the classifier located on an application server 544

Outputting instructions output the rules to the classifier located on a data processing server that consumes HTTP parameters of the back end calls 548

Logic flow is a purchasing flow or a search flow 552

Labeled data set comprises the back end calls to a URL and additional back end calls to the URL 556

Rules comprise at least one of a decision tree, a support vector machine, a logistic regression model, and classification rules 560

FIG. 5B

USER INTERACTION LOGIC CLASSIFICATION

BACKGROUND

In the context of application performance monitoring, discovering underlying business logic flows may involve end users manually creating rules that extract specific parameters from a network call and that classify a transaction according to these parameters. Some approaches that utilize supervised machine learning techniques may involve data labeling.

BRIEF DESCRIPTION OF THE DRAWINGS

FIGS. 5A and 5B are a block diagram of a non-transitory machine-readable storage medium according to an example of the present disclosure.

DETAILED DESCRIPTION

Figure 1:
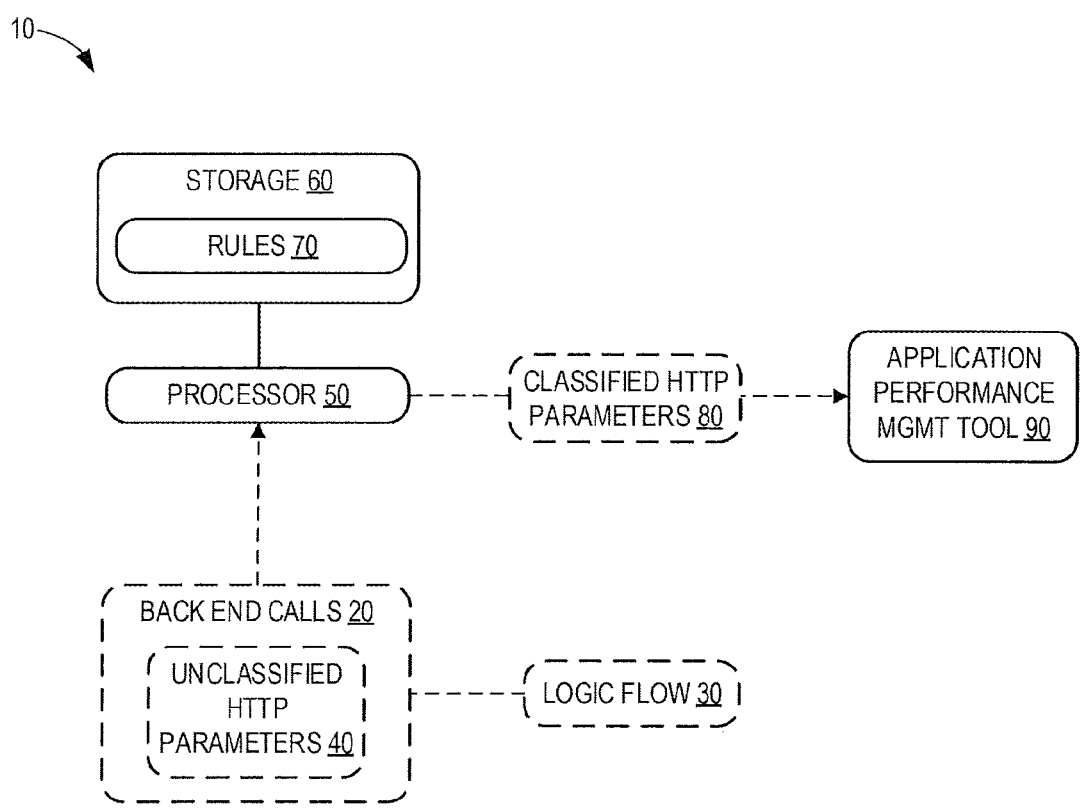
FIG. 1 is a block diagram of a system for using rules to associate parameters with a logic flow according to an example of the present disclosure.

Application performance monitoring tools may monitor the performance of applications and the transactions that are associated with such performance. The underlying business logic flow of user interactions with applications and the corresponding transactions may be tracked. This logic flow may be the logical entity that application owners and developers may use to identify, monitor, and generate reports with respect thereto. Where applications are deployed to serve a business need, such as on-line purchasing, on-line banking, etc., such application performance data may help an application or business owner determine how well the application is functioning. This information, in turn, may translate to a better understanding of end user satisfaction with the application and/or insight into the broader business impact of the performance of the application.

In some examples in which an agent or other instrumentation monitors an application, identifying transactions of interest from among a variety of transactions can prove challenging. For example, in some applications a significant amount of code may be running, with a relatively smaller amount of the code impacting a user flow or user experience that is of interest. By contrast, a larger amount of the code may be unrelated to, and may have negligible or no effect on, the user flow or experience.

For example, some network calls to back end URLs may or may not be relevant to a user flow or user experience of an application. In some examples, certain parameters of such URLs may be identified and used to discover relevant back end calls. However, depending upon whether a given back end call impacts the user flow or experience, the parameters of a given URL may or may not be relevant. In some examples, there may be many irrelevant parameters and a smaller number of parameters that actually determine the business context. Identifying relevant parameters may prove challenging.

Classifying transactions in web and mobile application development systems can introduce additional challenges. In some web and mobile application architectures, a single URL entry may service multiple business logic flows. This single URL may be distinguished into different underlying business logic flows by parameters or other content of an HTTP request. In examples where an application utilizes a single URL to service multiple business logic flows, discovering and associating a particular business logic flow with a particular corresponding user interaction can prove challenging. In these examples, the particular parameters of a network call or other input to the URL will dictate which business logic flow or transaction is being performed. Accordingly, simply identifying the URL to which a network call is directed may not be sufficient to identify the underlying business logic flow of the user interaction. Additionally, parameters and other aspects of a URL may change over time, and a user or developer may have limited awareness or insight into such changes.

In some examples the present disclosure is directed to classifying back end business transaction logic via URL parameters originating from mobile or web user actions by using a semi-supervised learning technique. Mobile or web user actions may be valuable in this context because correctly-detected user actions may have a strong correlation to the underlying business flow. In this manner, such user actions may make good labels for the goal of classifying according to that logic. A small set of labeled data may be automatically discovered during runtime. This labeled data may be used to train a generalized supervised learning model to find the most relevant URL parameters. Rules derived from the supervised learning model may be used to classify unlabeled data of business transactions that are collected by a machine agent. In some examples the present disclosure may be useful in analyzing single URL interfaces, where a large number of varied parameters are in play—some of which influence the logic flow, others of which do not—and the parameters that are tied to the business logic flow decision may be determined.

The present disclosure describes examples of systems, methods and non-transitory machine-readable storage media for classifying back end transaction logic via URL parameters originating from user interactions with a client user interface (UI). In some examples and as described in more detail below, a labeled data set comprising back end calls and their associated logic flow is automatically discovered during runtime of an application. This labeled data may be used to train a supervised learning model. Rules derived from the supervised learning model may be used to classify unlabeled data of transactions that are collected by a machine agent. In this manner, new transactions may be automatically classified at runtime.

FIG. 1 shows a block diagram of a system 10 for using rules to associate unclassified HTTP parameters with a logic flow according to an example of the present disclosure. In some examples, an end user interacting with an application may initiate actions via a UI of the application. The actions may cause the UI to make back end network calls 20 to a URL. In some examples such a backend network call 20 may trigger or otherwise correspond to a logic flow 30, such as a business logic flow. Without being labeled or otherwise associated with the logic flow 30, the parameters of such backend network calls 20 may comprise unclassified HTTP parameters 40. In the context of the present disclosure, an "unclassified parameter" is not associated with a particular logic flow, such as logic flow 30.

As described in more detail below, in some examples an application may be instrumented to provide the backend calls 20 to a computing system comprising a processor 50 (or multiple processors 50). The processor(s) 50 may comprise a physical device to execute at least one instruction. In some examples, the processor(s) 50 may include hardware logic circuit(s) or firmware device(s) to execute hardware-implemented logic or firmware instructions. Processor(s) 50 may be single-core or multi-core, and the instructions executed thereon may be for sequential, parallel, and/or distributed processing.

In some examples, individual components of the processor(s) 50 may be distributed among two or more separate devices, which may be remotely located and/or designed for coordinated processing. Aspects of the processor(s) may be virtualized and executed by remotely accessible, networked computing devices in a cloud-computing configuration. In such an example, these virtualized aspects may be run on different physical logic processors of various different machines.

Processor(s) 50 may execute instructions that are stored on a non-transitory machine-readable storage medium. Such instructions may be part of an application, service, program, routine, library, object, component, data structure, or other logical construct. Such instructions may be implemented to perform a task, implement a data type, transform the state of at least one device, or otherwise arrive at a result, as described in more detail below.

With continued reference to FIG. 1, the processor(s) 50 may be coupled to a non-transitory machine-readable or computer-readable storage medium 60. The storage 60 may store rules 70 that associate HTTP parameters with a particular logic flow. As described in more detail below, in some examples the rules 70 may be derived from a supervised learning model.

At runtime of the application and using the rules 70, the processor(s) 50 may execute instructions to associate the unclassified HTTP parameters 40 with a particular logic flow, such as logic flow 30, to generate classified HTTP parameters 80. The processor 50 may then execute instructions to output the classified HTTP parameters 80 (that are now associated with logic flow 30) to an application performance management tool 90.

Figure 2:
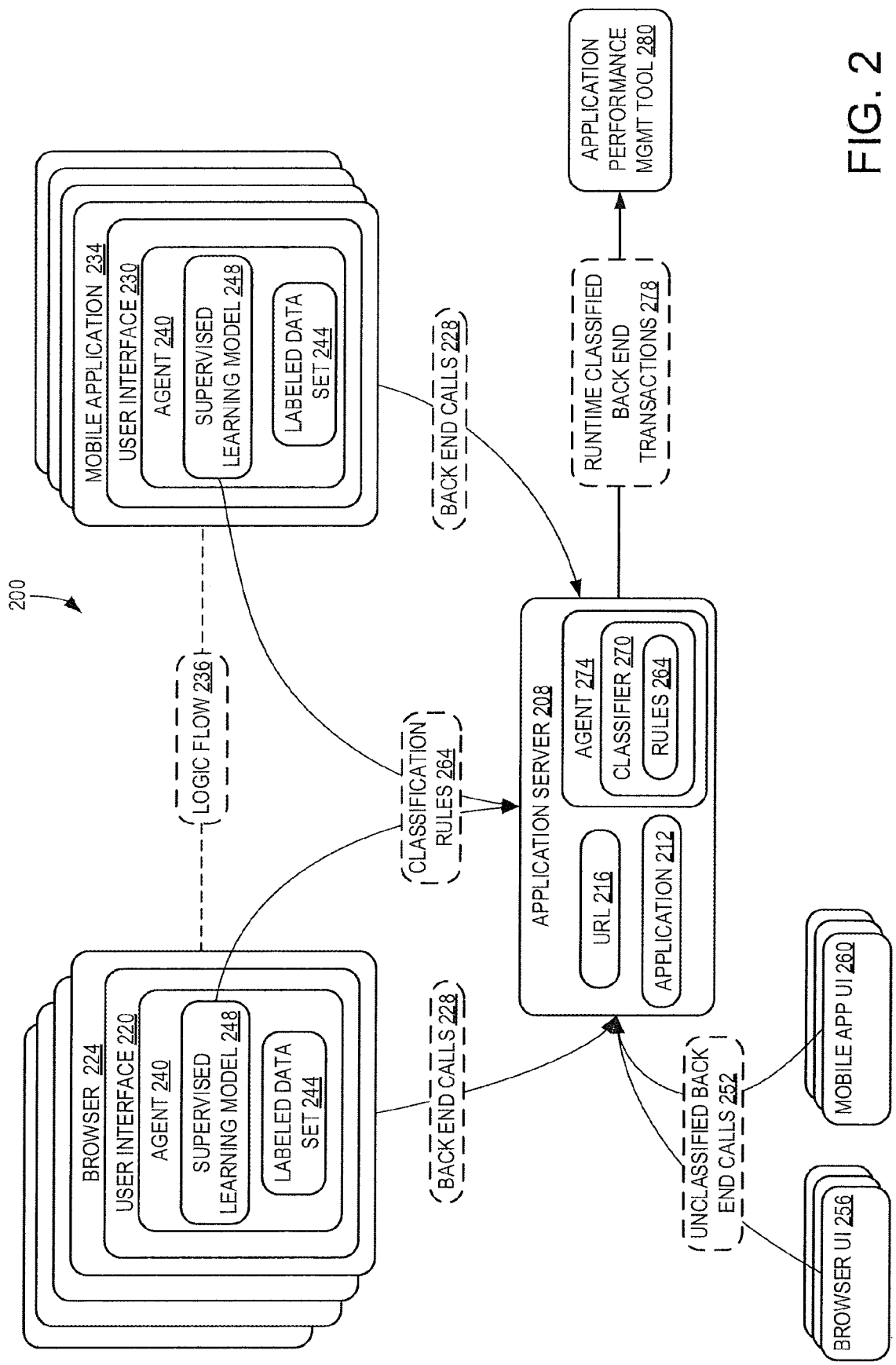
FIG. 2 is a block diagram of a system for associating back end calls with logic flow according to an example of the present disclosure.

With reference now to FIG. 2, block diagram of a system 200 for associating back end calls with a logic flow according to an example of the present disclosure is provided. In this example, an application server 208 may run a web application 212. The web application 212 may utilize a URL 216 that serves as an entry point for servicing multiple business logic flows associated with the application. The URL 216 may be distinguished into different business logic flows by HTTP parameter(s) and/or other content provided by an HTTP request of a backend call. In some examples, HTTP parameters may comprise at least one of an HTTP header and a POST payload.

In some examples, a user of a client computing device, such as a wearable computing device, smartphone, tablet, notebook, desktop, or other computing device, may interact with application 212 via a client user interface 220 displayed on a browser 224 that is executed on the client. As illustrated in FIG. 2, in some examples multiple browsers 224 executed on multiple different computing devices may interact with application 212. These interactions may cause back end network calls 228 to be made to URL 216.

In some examples, a user may interact with application 212 via a user interface 230 displayed via a mobile application 234 executed on a computing device, such as a wearable computing device, smartphone, tablet, notebook, or other mobile computing device. Multiple computing devices may execute multiple copies of the mobile application 234 to enable various users to interact with application 212. As with the browsers 224, these interactions may cause back end network calls 228 to be made to URL 216.

In some examples, the actions a user initiates on the user interface 220/230 may have a high correlation to the underlying business logic. For example, a user selecting a "Buy" or "Money Transfer" button is most likely triggering a purchasing business flow. In another example, a user action that initiates a "Search for XYZ" transaction in the user interface often belongs to a specific search business flow on the back end. Accordingly, capturing a user's intent via interactions with a user interface may allow the association of aspects of the interaction, such as underlying network calls that are triggered when the interaction is executed, with a particular logic flow 236.

In some examples, an agent 240 may instrument the UI 220/230 of the web application 212 or mobile application 234. The agent 240 may apply user action detection techniques to create an association between a logical interaction with the UI and the back end network calls (including parameters such as HTTP headers, POST data, etc.) that are made as a result of the interaction. For example, the agent 240 may detect a user input (such as a button selected, an input slider swiped, etc.) and may identify corresponding network call(s) that are triggered by or otherwise follow this user input. That is, back end calls 228 that are triggered by a user interaction with a client user interface 220/230 may be identified. The user interaction also may be correlated with a particular logic flow 236. In this manner, the identified back end calls 228 may be associated with the logic flow 236.

For example, an agent instrumenting the mobile or web application UI may allow non-intrusive programmatic detection and tracking of code executed by the UI. The specific instrumentation techniques may vary depending upon the underlying technology. For example, mobile UI instrumentation of Android or iOS operating systems may use bytecode instrumentation of the mobile application. In other examples, web application instrumentation may use a form of JavaScript injection to intercept code.

Such instrumentation may capture and determine the UI widgets (buttons, tabs, menus, etc.) with which the user interacts, including data such as a location in the UI where a user interaction/selection (click, swipe, etc.) occurs, the name of a button or other UI widget, how long the UI takes to respond to such interaction, and the internal UI flows triggered and particular network call(s) initiated by such action. Capturing the network call(s) that are initiated as part of a user action may include associating contextual information about the user action (button name, etc) with the URL/network call. This associated information may be subsequently encoded with the network call to form a discovered "label" that is reported, along with other data, to collection servers of a performance monitoring tool.

In this manner, a labeled data set 244 comprising back end calls 228 that are classified according to their associated logic flow may be generated. That is, a labeled data set 244 of URL patterns and their relationship to specific business logic may be created. The labeled data set 244 may comprise HTTP parameters of the back end calls 228. Accordingly, this user action-to-network call mapping may be utilized to generate the labeled data set 244 from back end network calls 228 having their origin at the monitored user UI 220/230.

In some examples, protocol parameters of the back end calls 228 may be prioritized according to a probability of association with the logic flow 236. For example, HTTP protocol parameters such as HTTP headers and/or payload content may be analyzed to identify content that is likely to be associated with a particular logic flow. In one example, a back end call 228 that is triggered by a search request may include a path describing the search query, such as a path including a "/search?" parameter. Upon identifying this path, the back end call 228 may be tagged with a high priority of being associated with a search logic flow.

The labeled data set 244 may be used to train a supervised learning model 248 that may be utilized to associate other back end calls to the URL 216 with particular flow logic as described in more detail below. In this manner, the supervised learning model 248 may learn the relevant parameters for classifying business logic for different classes of back end calls 228. As described in more detail below, such a model may then be applied to a generalized set of unclassified transactions that comprise unclassified back end calls 252 to URL 216 that may flow through the application server 208 from a variety different sources. For example, unclassified back end calls 252 may be received from other browser UI(s) 256, other mobile application UI(s) 260, other machine-to-machine callers, and/or other external callers of the URL 216. In this manner, the system 200 may correctly identify particular operations and report them to an application performance management tool, even when such operations are not called in context of a labeled user action, or when such operation(s) occur in a component where UI/user action instrumentation is not possible or practical.

In various examples, the supervised learning model 248 may comprise classification rules, a logistic regression model, decision tree model, support vector machine (SVM) model, or other suitable supervised learning model or techniques. This model may be built incrementally over time and may increase in accuracy over time as more data is collected. The supervised learning model 248 may classify and predict the most probable logic flow to which a new, unclassified back end call 252 may relate. Using such a model, the system 200 may determine which parameters are most relevant in classifying a back end call 252 with a particular logic flow.

In some examples, classification rules 264 may be derived using the supervised learning model 248. The classification rules 264 may be outputted to a classifier application 270 on the application server 208. As shown in the example of FIG. 2, the classifier application 270 may be associated with an agent 274 instrumenting the application server 208. In this manner, such classification rules 264 may be utilized by the classifier application 270 at runtime to associate the unclassified back end calls 252 with a particular logic flow, such as logic flow 236, to create runtime classified back end transactions 278. The agent 274 may provide such runtime classified back end transactions 278 to an application performance management tool 280 for processing and analysis.

As noted above, in some examples the supervised learning model 248 may take the form of a logistic regression model, decision tree model, support vector machine (SVM) model, or other suitable supervised learning model or techniques. In these other examples, rules corresponding to the particular supervised learning model may be outputted to the classifier application 270. For example, where the supervised learning model 248 takes the form of a decision tree, decision rules corresponding to the decision tree may be outputted to the classifier application 270.

As the application 212 changes over time, monitoring of the browser(s) 224 and/or mobile application(s) 234 will continue to generate labeled data that reflect such changes. In this manner, such data may be used to automatically and periodically retrain the supervised learning model 248 to account for changes to the application, including changes in how transactions should be classified based on the data detected during runtime.

Figure 3:
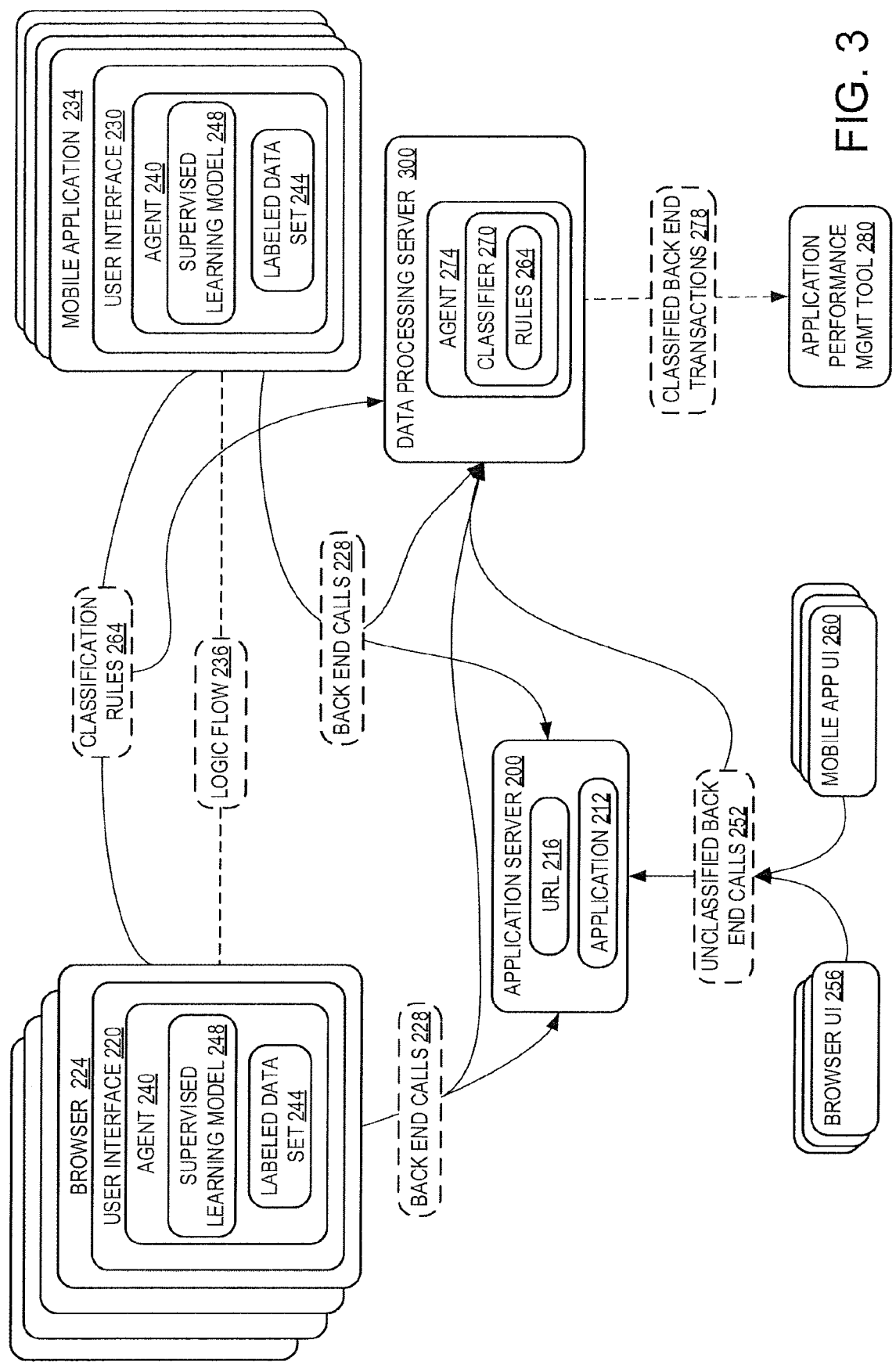
FIG. 3 is a block diagram of a system for associating back end calls with logic flow according to an example of the present disclosure.

With reference now to FIG. 3, in another example implementation the classification decision may be taken via a classifier application 270 located on a data processing server 300. In this example implementation, the data processing server 300 may consume agent data comprising classified back end calls 228 received from client user interface(s) 220 displayed on browser(s) 224 and/or user interface(s) 230 displayed via mobile application(s) 234 executed on computing device(s). As described above, an agent 240 instrumenting UI 220 and/or UI 230 may apply user action detection techniques to create an association between a logical interaction with the UI and the back end network calls that are made as a result of the interaction. In this manner, the identified back end calls 228 may be associated with the logic flow 236.

As described above, a labeled data set 244 comprising back end calls 228 that are classified according to their associated logic flow may be generated. The labeled data set 244 may be used to train a supervised learning model 248 that may be utilized to associate unclassified back end calls 252 to the URL 216 with particular flow logic.

In some examples and as described above, classification rules 264 may be derived using the supervised learning model 248. In the example of FIG. 3, the classification rules 264 may be outputted to a classifier application 270 on the data processing server 300. The classifier application 270 may be associated with an agent 274 instrumenting the data processing server 300. In this manner, such classification rules 264 may be utilized by the classifier application 270 to associate the unclassified back end calls 252 with a particular logic flow, such as logic flow 236, to create classified back end transactions 278. The agent 274 may provide such classified back end transactions 278 to an application performance management tool 280 for processing and analysis.

It will be appreciated that the examples shown in FIGS. 2 and 3 and described above are provided as examples, and that many variations in the details of these implementations are possible.

Figure 4:
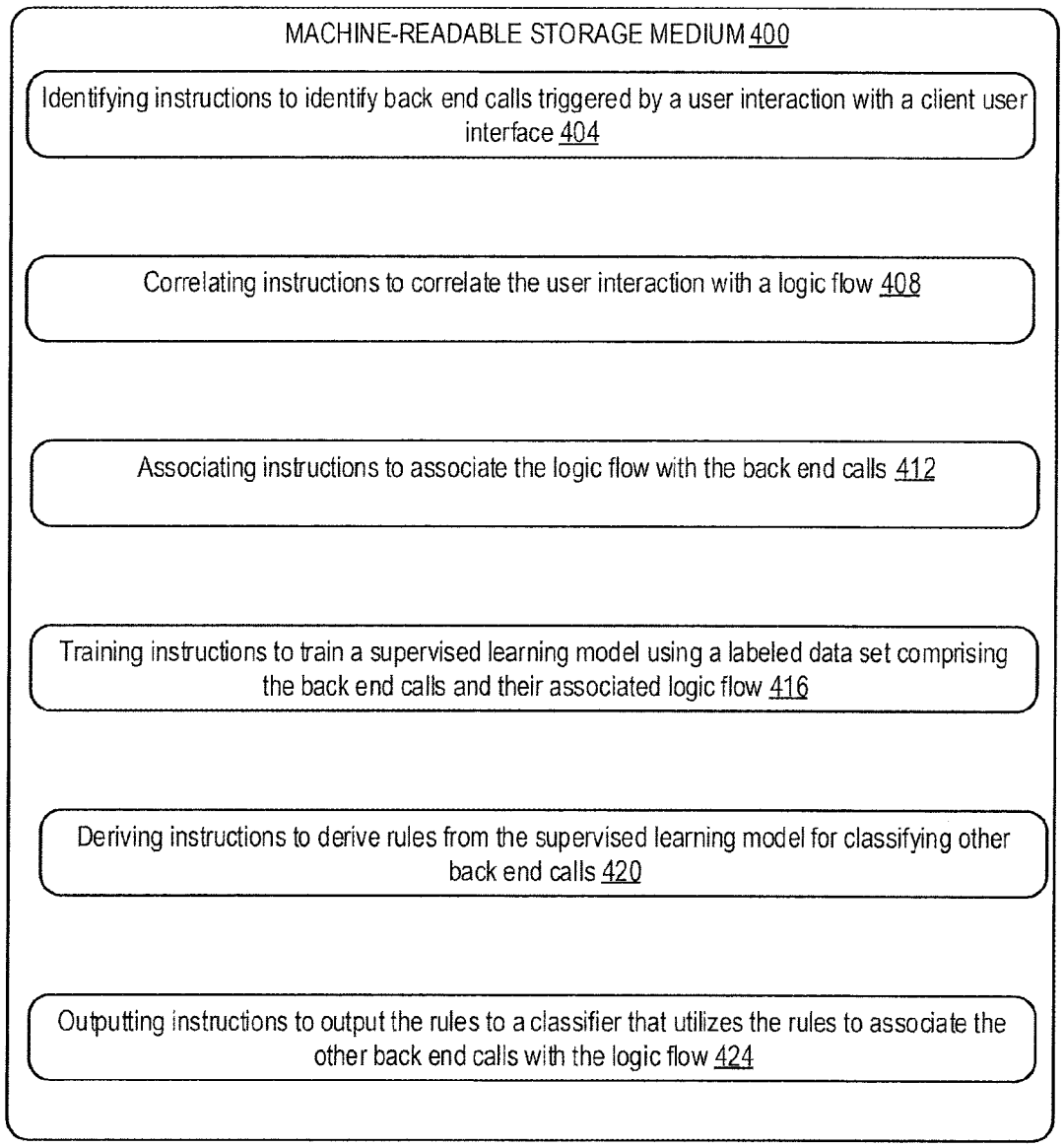
FIG. 4 is a block diagram of a non-transitory machine-readable storage medium according to an example of the present disclosure

With reference now to FIG. 4, a block diagram of a non-transitory machine-readable storage medium 400 containing instructions according to an example of the present disclosure is provided. In some examples and with reference also to the system 10 illustrated in FIG. 1, the non-transitory machine-readable storage medium 400 may comprise instructions executable by processor 50. When executed by at least one processor, such as processor 50 of the system 10 of FIG. 1, such instructions may associate unclassified parameters with a logic flow in a manner consistent with the following example and other examples described herein.

In the example of FIG. 4, the instructions of non-transitory machine-readable storage medium 400 may include identifying instructions to, at 404, identify back end calls triggered by a user interaction with a client user interface. The storage medium 400 may include correlating instructions to, at 408, correlate the user interaction with a logic flow. The storage medium 400 may include associating instructions to, at 412, associate the logic flow with the back end calls. The storage medium 400 may include training instructions to, at 416, train a supervised learning model using a labeled data set comprising the back end calls and their associated logic flow. The storage medium 400 may include deriving instructions to, at 420, derive rules from the supervised learning model for classifying other back end calls. The storage medium 400 may include outputting instructions to, at 424, output the rules to a classifier that utilizes the rules to associate the other back end calls with the logic flow.

With reference now to FIGS. 5A and 5B, a block diagram of a non-transitory machine-readable storage medium 500 containing instructions according to an example of the present disclosure is provided. In some examples and with reference also to the system 10 illustrated in FIG. 1, the non-transitory machine-readable storage medium 500 may comprise instructions executable by processor 50. When executed by at least one processor, such as processor 50 of the system 10 of FIG. 1, such instructions may associate unclassified parameters with a logic flow in a manner consistent with the following example and other examples described herein.

In the example of FIGS. 5A and 5B, the instructions of non-transitory machine-readable storage medium 500 may include identifying instructions to, at 504, identify back end calls triggered by a user interaction with a client user interface. The storage medium 500 may include correlating instructions to, at 508, correlate the user interaction with a logic flow. The storage medium 500 may include associating instructions to, at 512, associate the logic flow with the back end calls. The storage medium 500 may include training instructions to, at 516, train a supervised learning model using a labeled data set comprising the back end calls and their associated logic flow. The storage medium 500 may include deriving instructions to, at 520, derive rules from the supervised learning model for classifying other back end calls. The storage medium 500 may include outputting instructions to, at 524, output the rules to a classifier that utilizes the rules to associate the other back end calls with the logic flow.

At 528 the back end calls may be made to a URL, and the other back end calls may be unclassified back end calls that are made to the URL. At 532 the labeled data set may comprise HTTP parameters of the back end calls. With reference now to FIG. 5B, at 536 the HTTP parameters may comprise at least one of an HTTP header and a POST payload. At 540 the storage medium 500 may include prioritizing instructions to prioritize protocol parameters of the back end calls according to a probability of association with the logic flow. At 544 the outputting instructions may output the rules to the classifier located on an application server.

At 548 the outputting instructions may output the rules to the classifier located on a data processing server that consumes HTTP parameters of the back end calls. At 552 the logic flow may be a purchasing flow or a search flow. At 556 the labeled data set may comprise the back end calls to a URL and additional back end calls to the URL. At 560 the rules may comprise at least one of a decision tree, a support vector machine, a logistic regression model, and classification rules.

Figure 6:
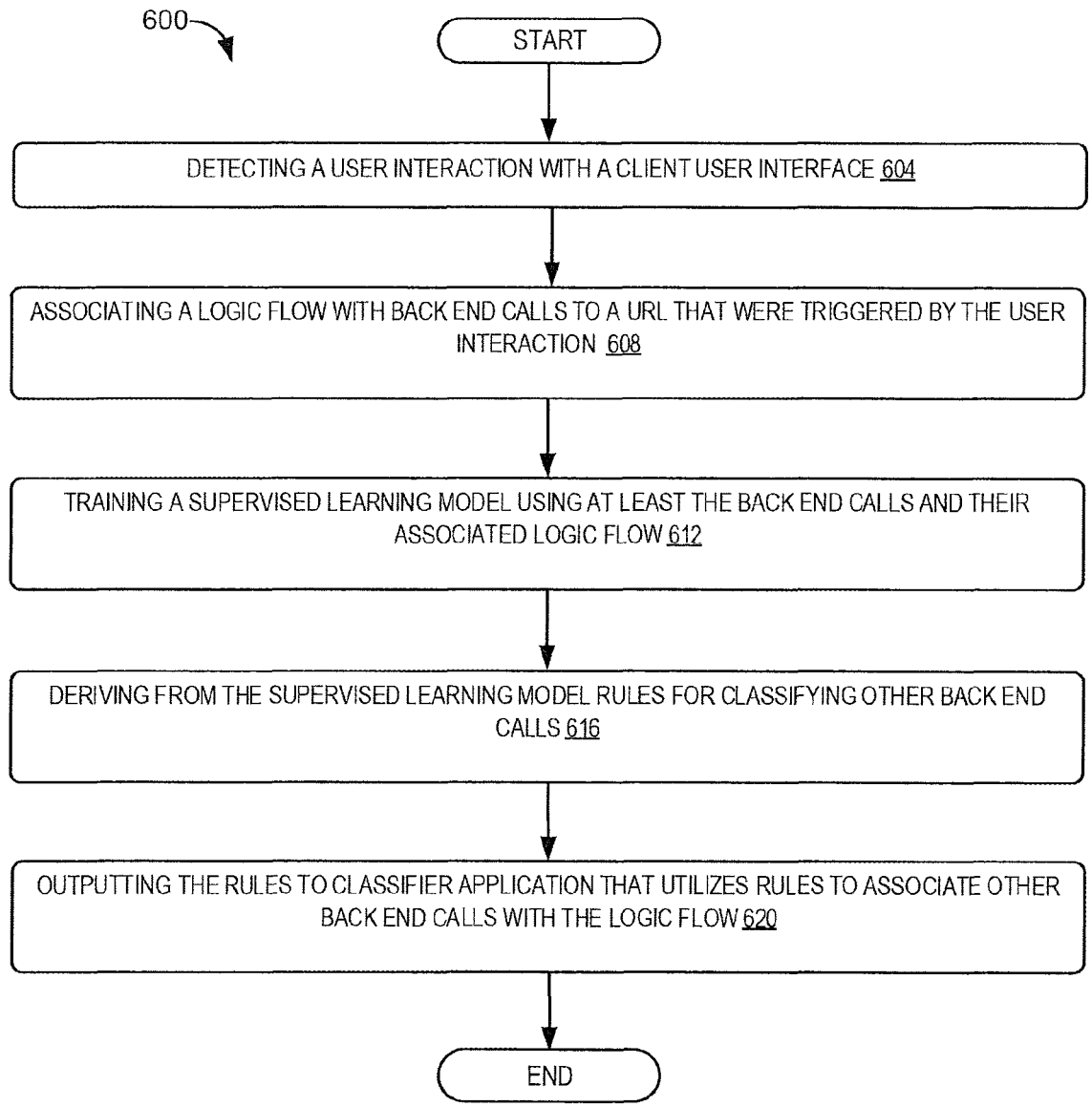
FIG. 6 is a flow chart of a method for deriving rules for classifying back end calls according to an example of the present disclosure.

Turning now to FIG. 6, a flow chart of a method 600 for deriving rules for classifying back end calls according to another example of the present disclosure is provided. The following description of method 600 is provided with reference to the software and hardware components described above and shown in FIGS. 1-5. The method 600 may be executed in the form of instructions encoded on a non-transitory machine-readable storage medium that is executable by a processor. It will be appreciated that method 600 may also be performed in other contexts using other suitable hardware and software components.

With reference to FIG. 6, at 604 the method 600 may include detecting a user interaction with a client user interface. At 608 the method 600 may include associating a logic flow with back end calls to a URL that were triggered by the user interaction. At 612 the method 600 may include training a supervised learning model using at least the back end calls and their associated logic flow. At 616 the method 600 may include deriving from the supervised learning model rules for classifying other back end calls. At 620 the method 600 may include outputting the rules to a classifier application that utilizes the rules to associate the other back end calls with the logic flow.

It will be appreciated that method 600 is provided by way of example and is not meant to be limiting. Therefore, it is to be understood that method 600 may include additional and/or other elements than those illustrated in FIG. 6. Further, it is to be understood that method 600 may be performed in any suitable order. Further still, it is to be understood that at least one element may be omitted from method 600 without departing from the scope of this disclosure.

Figure 7:
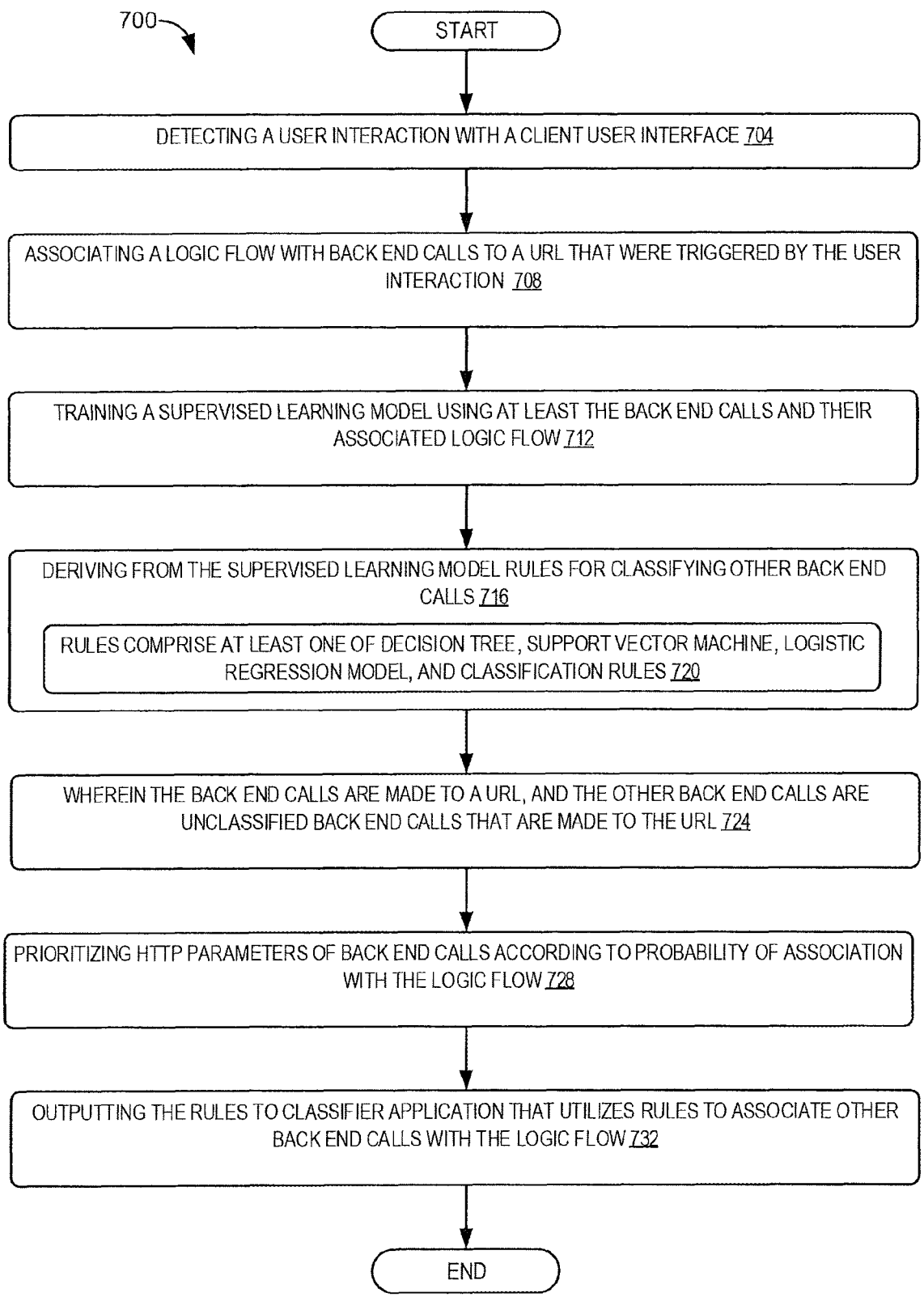
FIG. 7 is a flow chart of a method for deriving rules for classifying back end calls according to an example of the present disclosure.

With reference now to FIG. 7, a flow chart of a method 700 for deriving rules for classifying back end calls according to another example of the present disclosure is provided. The following description of method 700 is provided with reference to the software and hardware components described above and shown in FIGS. 1-5. The method 700 may be executed in the form of instructions encoded on a non-transitory machine-readable storage medium that is executable by a processor. It will be appreciated that method 700 may also be performed in other contexts using other suitable hardware and software components.

With reference to FIG. 7, at 704 the method 700 may include detecting a user interaction with a client user interface. At 708 the method 700 may include associating a logic flow with back end calls to a URL that were triggered by the user interaction. At 712 the method 700 may include training a supervised learning model using at least the back end calls and their associated logic flow. At 716 the method 700 may include deriving from the supervised learning model rules for classifying other back end calls. At 720 the rules may comprise at least one of a decision tree, a support vector machine, a logistic regression model, and classification rules.

At 724 the back end calls may be made to a URL, and the other back end calls may be unclassified back end calls that are made to the URL. At 728 the method 700 may include prioritizing HTTP parameters of the back end calls according to a probability of association with the logic flow. At 732 the method 700 may include outputting the rules to a classifier application that utilizes the rules to associate the other back end calls with the logic flow.

The invention claimed is:

1. A non-transitory machine-readable storage medium encoded with instructions executable by a processor, the storage medium comprising:

instrumentation instructions within program code of a user interface to track execution of the program code in response to user actions with the user interface, wherein the execution results in a generation of first back end calls, and the tracking provides contextual information for the first back end calls;

correlating instructions to, based on the contextual information, associate the user actions with a logic flow;

associating instructions to associate the logic flow with the first back end calls;

training instructions to train a supervised learning model using a labeled data set comprising the first back end calls and the logic flow;

deriving instructions to derive rules from the supervised learning model for classifying other back end calls, wherein the first back end calls are made to a URL, and the other back end calls are unclassified back end calls that are made to the URL; and outputting instructions to output the rules to a classifier that utilizes the rules to associate the other back end calls with the logic flow.

2. The non-transitory machine-readable storage medium of claim 1, wherein the labeled data set comprises HTTP parameters of the first back end calls.

3. The non-transitory machine-readable storage medium of claim 2, wherein the HTTP parameters comprise at least one of an HTTP header and a POST payload.

4. The non-transitory machine-readable storage medium of claim 1, further comprising prioritizing instructions to prioritize protocol parameters of the first back end calls according to a probability of association with the logic flow.

5. The non-transitory machine-readable storage medium of claim 1, wherein the classifier is located on an application server.

6. The non-transitory machine-readable storage medium of claim 1, wherein the classifier is located on a data processing server that consumes HTTP parameters of the first back end calls.

7. The non-transitory machine-readable storage medium of claim 1, wherein the logic flow is a purchasing flow or a search flow.

8. The non-transitory machine-readable storage medium of claim 1, wherein the classifier uses the rules at runtime to associate the other back end calls with the logic flow.

9. The non-transitory machine-readable storage medium of claim 1, wherein the supervised learning model comprises at least one of a decision tree model, a support vector machine model, a logistic regression model, or classification rules.

10. The non-transitory machine-readable storage medium of claim 1, wherein the user interface comprises widgets, and the contextual information represents selection of the widgets by the user actions.

11. The non-transitory machine-readable storage medium of claim 1, wherein the contextual information represents a time for the user interface to respond to a given user action of the user actions.

12. The non-transitory machine-readable storage medium of claim 1, wherein the instrumentation instructions, when executed by the processor, cause the processor to intercept the program code.

13. A method, comprising:

using instrumentation instructions within program code of a user interface of a client to track execution of the program code in response to user actions with the user interface, wherein the execution results in a generation of first back end calls, and the tracking provides contextual data for the first back end calls;

based on the contextual data, associating the first back end calls to a uniform resource location (URL) to a logic flow;

training a supervised learning model using at least the first back end calls and the logic flow;

prioritizing HTTP parameters of the first back end calls according to a probability of association with the logic flow;

deriving, from the supervised learning model, rules for classifying other back end calls; and outputting the rules to a classifier application that utilizes the rules to associate the other back end calls with the logic flow.

14. The method of claim 13, wherein the other back end calls are unclassified back end calls that are made to the URL.

15. The method of claim 13, wherein the supervised learning model comprises at least one of a decision tree model, a support vector machine model, a logistic regression model, or classification rules.

* * * * *